(12) United States Patent
Kawano et al.

(10) Patent No.: US 11,805,098 B2
(45) Date of Patent: Oct. 31, 2023

(54) COMMUNICATION SYSTEM AND COMMUNICATION METHOD

(71) Applicant: Nippon Telegraph and Telephone Corporation, Tokyo (JP)

(72) Inventors: Shinya Kawano, Tokyo (JP); Hiroaki Sato, Tokyo (JP); Hideo Tsuchiya, Tokyo (JP); Akihiro Okada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 163 days.

(21) Appl. No.: 17/268,193

(22) PCT Filed: Aug. 9, 2019

(86) PCT No.: PCT/JP2019/031777
§ 371 (c)(1),
(2) Date: Feb. 12, 2021

(87) PCT Pub. No.: WO2020/036160
PCT Pub. Date: Feb. 20, 2020

(65) Prior Publication Data
US 2021/0168118 A1 Jun. 3, 2021

(30) Foreign Application Priority Data
Aug. 15, 2018 (JP) ................... 2018-152993

(51) Int. Cl.
*H04L 29/06* (2006.01)
*H04L 9/40* (2022.01)

(52) U.S. Cl.
CPC ........ *H04L 63/0209* (2013.01); *H04L 63/029* (2013.01)

(58) Field of Classification Search
CPC ... H04L 63/0209; H04L 63/029; H04L 63/10; H04L 63/1441; H04L 63/145; H04L 47/10; H04L 65/4038
(Continued)

(56) References Cited

U.S. PATENT DOCUMENTS 8,584,194 B1* 11/2013 Kerr ................... H04L 63/1491
709/227
2007/0250627 A1* 10/2007 May ....................... H04L 63/20
709/225
(Continued)

FOREIGN PATENT DOCUMENTS

JP 2006-005555 1/2006
JP 2006-222724 8/2006
(Continued)

OTHER PUBLICATIONS

Techmatrix.co.jp, [online], "Flexible deployment configuration," 2018, retrieved on Jun. 27, 2018, retrieved from URL<https://www.techmatrix.co.jp/product/paloalto/architecture.html>, 15 pages (with English Translation).

*Primary Examiner* — Tri M Tran
(74) *Attorney, Agent, or Firm* — Fish & Richardson P.C.

(57) ABSTRACT

A communication system (1) includes a terminal information acquisition unit configured to acquire version information of an OS of a terminal (10), a comparison unit configured to compare a version of the OS of the terminal (10) acquired by the terminal information acquisition unit with a latest version of the corresponding OS, and a setting unit configured to set, when the version of the OS of the terminal (10) is not the latest version, a path along which traffic of the terminal (10) passes through a security appliance (5), and set, when the version of the OS of the terminal (10) is the (Continued)

latest version, a path along which the traffic of the terminal (10) does not pass through the security appliance (5).

5 Claims, 10 Drawing Sheets

(58) Field of Classification Search
USPC .......................................................... 726/11
See application file for complete search history.

(56) References Cited

U.S. PATENT DOCUMENTS

| | | |
|---|---|---|
| 2009/0007218 A1* | 1/2009 | Hubbard ................. H04L 63/02 |
| | | 726/1 |
| 2015/0026794 A1 | 1/2015 | Zuk et al. |
| 2017/0149808 A1 | 5/2017 | Hamada et al. |
| 2017/0230334 A1* | 8/2017 | Newell ................. H04W 12/37 |
| 2019/0253274 A1* | 8/2019 | Van Dussen ........ H04L 12/4641 |
| 2020/0014662 A1* | 1/2020 | Chanda ............... H04L 41/5041 |

FOREIGN PATENT DOCUMENTS

| | | |
|---|---|---|
| JP | 2008-271242 | 11/2008 |
| JP | 2010-533392 | 10/2010 |
| JP | 2016-528809 | 9/2016 |
| WO | WO 2015/194604 | 12/2015 |

\* cited by examiner

| TERMINAL | OS | LATEST VERSION |
|---|---|---|
| A | OS-1 | 7 |
| B | OS-2 | 2 |
| C | OS-1 | 7 |

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/031777, having an International Filing Date of Aug. 9, 2019, which claims priority to Japanese Application Serial No. 2018-152993, filed on Aug. 15, 2018. The disclosure of the prior application is considered part of the disclosure of this application, and is incorporated in its entirety into this application.

TECHNICAL FIELD

The present invention relates to a communication system and a communication method.

BACKGROUND ART

A security service is provided in a network connection service for connection to the Internet or various networks via a carrier network. For example, in a security service of a network carrier, a method of analyzing traffic of a subscriber using a security appliance and ensuring security is common. A security appliance is a security apparatus that analyzes and blocks attacks that exploit terminal vulnerability.

As a scheme for utilizing a security appliance, a scheme for installing a security appliance inline and causing all traffic to pass through this security appliance is generally adopted. In this scheme, it becomes possible to apply a security policy to each terminal by setting address information or the like of the terminal in the security appliance in advance. Further, it becomes possible to apply a security appliance apparatus to each terminal or each flow by setting address information of the terminal in a transfer apparatus such as a router to which the security appliance is connected in advance.

CITATION LIST

Non Patent Literature

Non Patent Literature 1: echMatrix, Flexible Introduction Configuration, [online], [Retrieved on Jul. 24, 2018], Internet<URL: https://www.techmatrix.co.jp/product/paloalto/architecture.html>

SUMMARY OF THE INVENTION

Technical Problem

A security appliance performs high load processing, such as analyzing even information of a higher layer of traffic of a subscriber. Thus, there is a problem in that an apparatus having a large-scale configuration is required in order to process a large amount of traffic with the security appliance.

The present invention is made in view of the above and an object of the present invention is to provide a communication system and a communication method capable of ensuring security while reducing a load of the security apparatus.

Means for Solving the Problem

In order to solve the above-described problems and achieve the object, a communication system according to the present invention is a communication system in which a terminal is connected to a network and is connectable to a security apparatus, the communication system including: an acquisition unit configured to acquire version information of an operating system (OS) of the terminal; a comparison unit configured to compare a version of the OS of the terminal acquired by the acquisition unit with a latest version of the corresponding OS; and a setting unit configured to set, when the version of the OS of the terminal is not the latest version, a path along which traffic of the terminal passes through the security apparatus, and set, when the version of the OS of the terminal is the latest version, a path along which the traffic of the terminal does not pass through the security apparatus.

Effects of the Invention

According to the present invention, it is possible to ensure security while reducing a load of a security apparatus.

DESCRIPTION OF EMBODIMENTS

Hereinafter, an embodiment of the present invention will be described in detail with reference to the drawings. The present invention is not limited by the embodiment. In illustration of the drawings, the same parts are denoted by the same reference signs.

Embodiment

Figure 1:
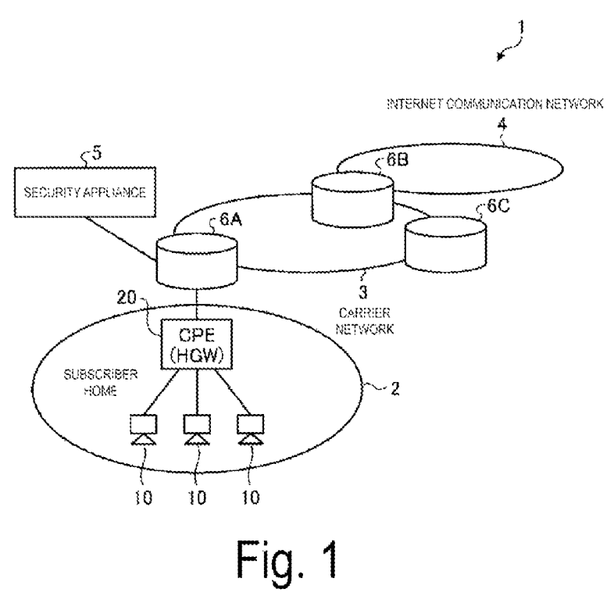
FIG. 1 is a diagram illustrating an example of a of a communication system according configuration to an embodiment.

An embodiment of the present invention will be described. FIG. 1 is a diagram illustrating an example of a configuration of a communication system according to the present embodiment.

As illustrated in FIG. 1, the communication system 1 according to the embodiment has a configuration in which a subscriber home network 2 connects to an Internet communication network 4 via routers 6A to 6C of a carrier network 3. The communication system 1 can also be connected to a security appliance 5 (security apparatus).

In the subscriber home network 2, one or more terminals 10 connect to CPE 20 (network device). The terminal 10, for example, connects to the carrier network 3 via the CPE 20 and the router 6A and connects to the Internet communication network 4 via the router 6B. The terminal 10 is, for example, a personal computer, a smartphone, or a mobile phone. The CPE 20 is a so-called home gateway (HGW).

The security appliance 5 analyzes received traffic of the terminal 10 and blocks communication of the terminal 10 according to a result of the analysis. The security appliance can also analyze even information of a higher layer of the terminal 10.

This communication system 1 applies the security appliance 5 to only traffic of the terminal 10 including vulnerability, rather than passing all traffic through the security appliance 5, to thereby ensure security while reducing a load of the security appliance 5.

Here, in the embodiment, an update status of software such as an OS of the terminal 10 is adopted as a criterion for a vulnerability determination of the terminal 10. In the embodiment, the CPE 20 confirms a state of an operating system (OS) of the terminal 10 to which the CPE 20 is connected, and sets the terminal 10 to pass the security appliance 5 according to the OS state of the terminal 10.

Configuration of CPE

Figure 2:
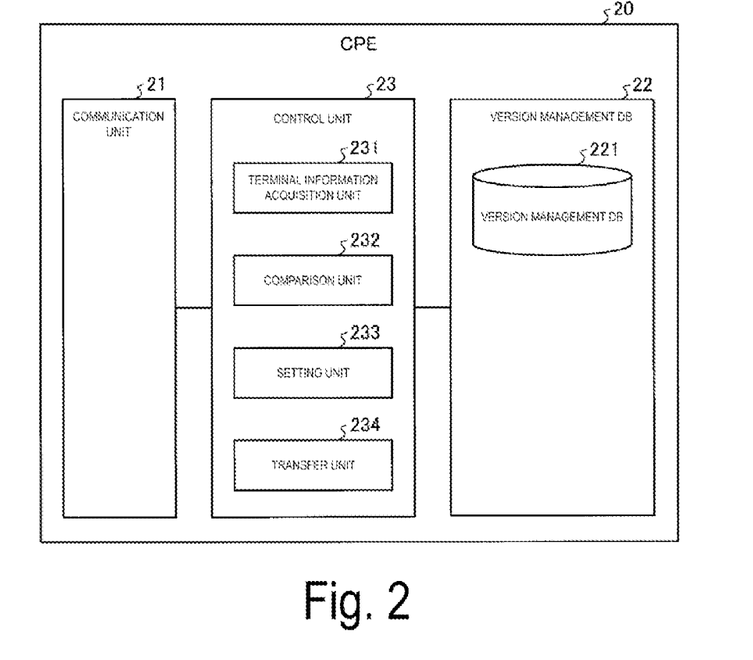
FIG. 2 is a diagram illustrating an example of a configuration of customer premises equipment (CPE) illustrated in FIG. 1.

A configuration of the CPE 20 will be described. FIG. 2 is a block diagram illustrating an example of a configuration of the CPE 20 illustrated in FIG. 1. As illustrated in FIG. 2, the CPE 20 includes a communication unit 21, a storage unit 22, and a control unit 23.

The communication unit 21 is a communication interface that transmits and receives various pieces of information to and from another apparatus connected via a network 2 or the like. The communication unit 21 is realized by a network interface card (NIC) or the like, and performs communication between the other apparatus and a control unit 23 (which will be described below) via an electrical communication line such as a local area network (LAN) or the Internet.

The storage unit 22 is realized by a semiconductor memory element such as a random access memory (RAM) or a flash memory, or by a storage apparatus such as a hard disk or an optical disc, and stores a processing program for operating the CPE 20, data to be used during execution of the processing program, and the like. The storage unit 22 has a version management database (DB) 221.

Figure 3:
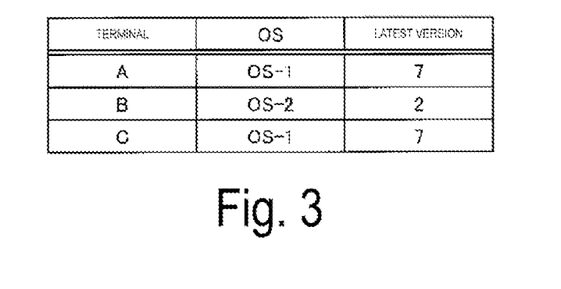
FIG. 3 is a diagram illustrating an example of a data configuration of version information.

The version management database 221 stores version information, for example. FIG. 3 is a diagram illustrating an example of a data configuration of the version information. As illustrated in FIG. 2, the version information includes identification information of each terminal 10 in the subscriber home network 2 to which the CPE 20 is connected, a type of OS for each terminal 10, and the latest version information of each OS. For example, "OS-1" as the type of OS and "7" as the latest version thereof are associated with terminal "A." The version information is appropriately updated on the basis of version update information of various OSs, or the like.

The control unit 23 controls the entire CPE 20. The control unit 23 includes an internal memory for storing a program that defines various processing procedures or the like, and required data, and executes various processes using the programs and the data. For example, the control unit 23 is an electronic circuit such as a central processing unit (CPU) or a micro processing unit (MPU). Further, the control unit 23 functions as various processing units by various programs operating. The control unit 23 includes a terminal information acquisition unit 231 (acquisition unit), a comparison unit 232, a setting unit 233, and a transfer unit 234.

The terminal information acquisition unit 231 acquires the version information of the OS of the terminal 10. The acquisition unit 231 acquires the version information of the OS of the terminal 10 using a simple network management protocol (SNMP) or the like and confirms the OS state of the terminal 10 when the terminal 10 is connected.

The comparison unit 232 compares the version of the OS of the terminal 10 acquired by the terminal information acquisition unit 231 with the latest version of the corresponding OS. The comparison unit 232 refers to version information of a version management DB 221 to determine whether the version of the OS of the terminal 10 acquired by the terminal information acquisition unit 231 is the latest version of the corresponding OS.

The setting unit 233 sets a communication path of the terminal 10 according to a result of the determination of the comparison unit 232. Specifically, when the version of the OS of the terminal 10 is not the latest version, the setting unit 233 sets a path along which traffic of the terminal 10 passes through the security appliance 5. When the OS of the terminal 10 is not the latest version, the terminal 10 is considered to include vulnerability, and thus the traffic of the terminal 10 proceeds to analysis in the security appliance 5.

When the version of the OS of the terminal 10 is the latest version, the setting unit 233 sets a path along which traffic of the terminal 10 does not pass through the security appliance 5. When the OS of the terminal 10 is the latest version, the terminal 10 does not include vulnerability, the traffic of the terminal 10 is considered to be secure, and the analysis of the security appliance 5 is omitted. This reduces a load of the security appliance 5.

The transfer unit 234 receives the packets transmitted by the terminal 10 or the packets directed to the terminal 10 and transfers the packets according to the setting of the setting unit 233. Specifically, when the setting unit 233 sets the path along which the traffic of the terminal 10 passes through the security appliance 5, the transfer unit 234 transfers the communication transmitted by the terminal 10 or the communication directed to the terminal 10 to the security appliance 5. When the setting unit 233 sets the path along which traffic of the terminal 10 does not pass through the security appliance 5, the transfer unit 234 transfers the communication transmitted by the terminal 10 to a transfer destination and transfers the communication directed to the terminal 10 to the terminal 10.

Flow of Communication Process

Figure 4:
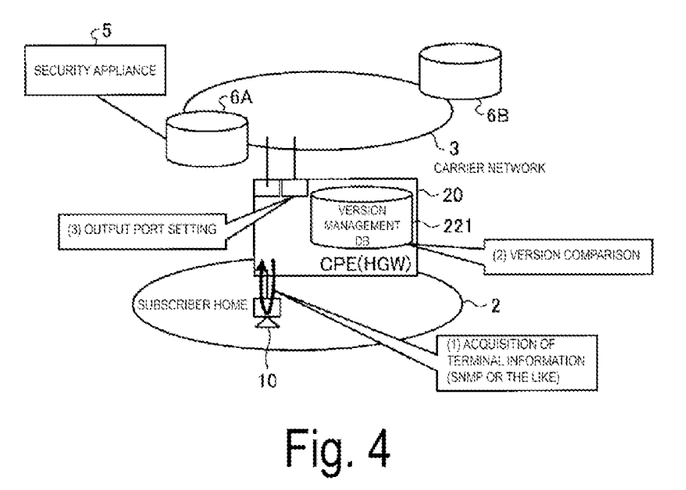
FIG. 4 is a diagram illustrating a flow of a communication process in the communication system illustrated in FIG. 1.
Figure 5:
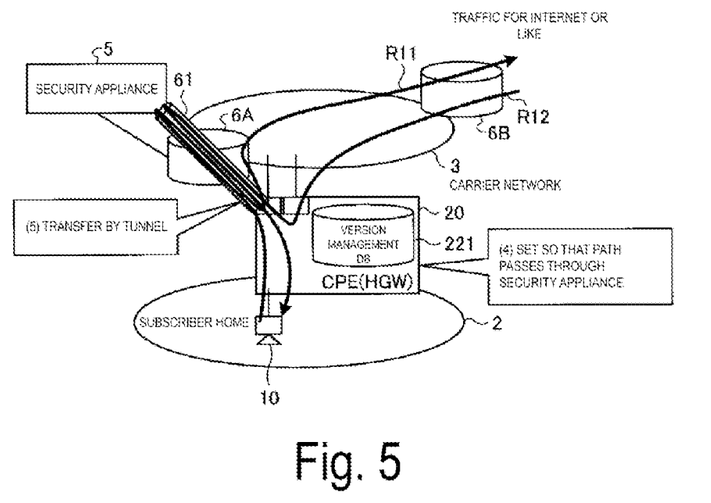
FIG. 5 is a diagram illustrating a flow of a communication process in the communication system illustrated in FIG. 1.
Figure 6:
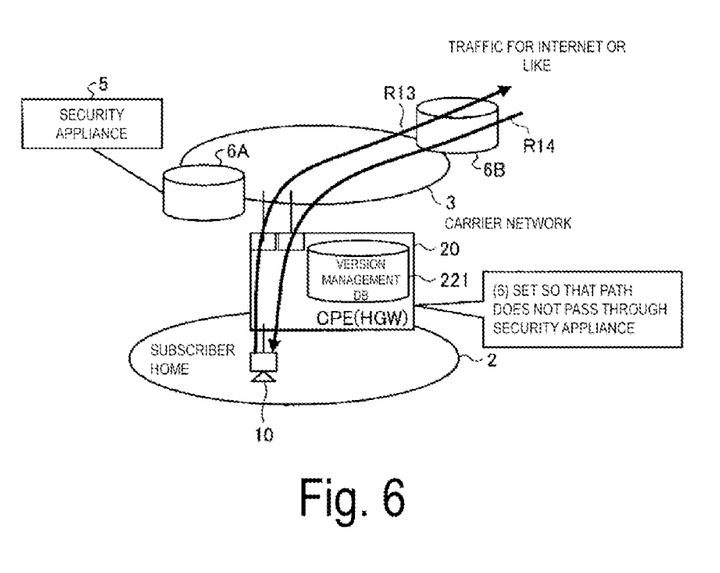
FIG. 6 is a diagram illustrating a flow of a communication process in the communication system illustrated in FIG. 1.

Hereinafter, a flow of a communication process in the communication system 1 will be described. FIGS. 4 to 6 are diagrams illustrating a flow of a communication process in the communication system 1 illustrated in FIG. 1.

As illustrated in FIG. 4, first, the CPE 20 acquires the version information of the OS of the terminal 10 using a simple network management protocol (SNMP) or the like (see FIG. 4(1)) and confirms the OS state of the terminal 10 when the terminal 10 is connected. Subsequently, the CPE 20 refers to the version information in the version management DB 221 to compare the acquired version of the OS of the terminal 10 with the latest version of the corresponding OS (see FIG. 4(2)). The CPE 20 then sets an output port of the terminal 10 according to a result of the comparison (see FIG. 4(3)).

For example, when the version of the OS of the terminal 10 is not the latest version, the CPE 20 sets a path along which traffic of the terminal 10 passes through the security appliance 5 (see FIG. 5(4)). That is, the CPE 20 sets an association between an output port of the CPE 20 and an IP address of the terminal 10 so that the path passes through the security appliance 5. Port setting can be realized by configuring the CPE 20 using Open vSwitch (OVS), and utilizing an Openflow technology. Traffic directed to the security appliance 5 is transferred by a connection being established by an L2 tunnel using a technique such as a Virtual eXtensible Local Area Network (VxLAN) between the CPE 20 and the security appliance 5, and a port connected to the L2 tunnel being set as the output port of the terminal 10 (see FIG. 5(5)).

As a result, communication that is traffic for the Internet or the like transmitted by the terminal 10 is transmitted to an Internet network along a path R11 that passes through the security appliance 5. Further, communication directed to the terminal 10 is transmitted to the terminal 10 along a path R12 that passes through the security appliance 5.

On the other hand, when the version of the OS of the terminal 10 is the latest version, the CPE 20 sets a path along which traffic of the terminal 10 does not pass through the security appliance 5 (see FIG. 6(6)). That is, the CPE 20 sets an association between the output port of the CPE 20 and the IP address of the terminal 10 so that the path does not pass through the security appliance 5.

As a result, packets that are the traffic for the Internet or the like transmitted by the terminal 10 are transmitted to the Internet network along a path R13 that does not pass through the security appliance 5. Further, the packets directed to the terminal 10 are transmitted to the terminal 10 along a path R14 that does not pass through the security appliance 5.

The CPE 20, for example, periodically confirms the state of the terminal 10 to change an appliance passing setting as follows. The CPE 20 performs, when the version of the OS of the terminal 10 is updated, a setting so that the path does not pass through the security appliance 5, and performs, when the version of the OS of the terminal 10 is an older version, a setting so that the path passes through the security appliance 5.

Processing Procedure of Communication Process

Figure 7:
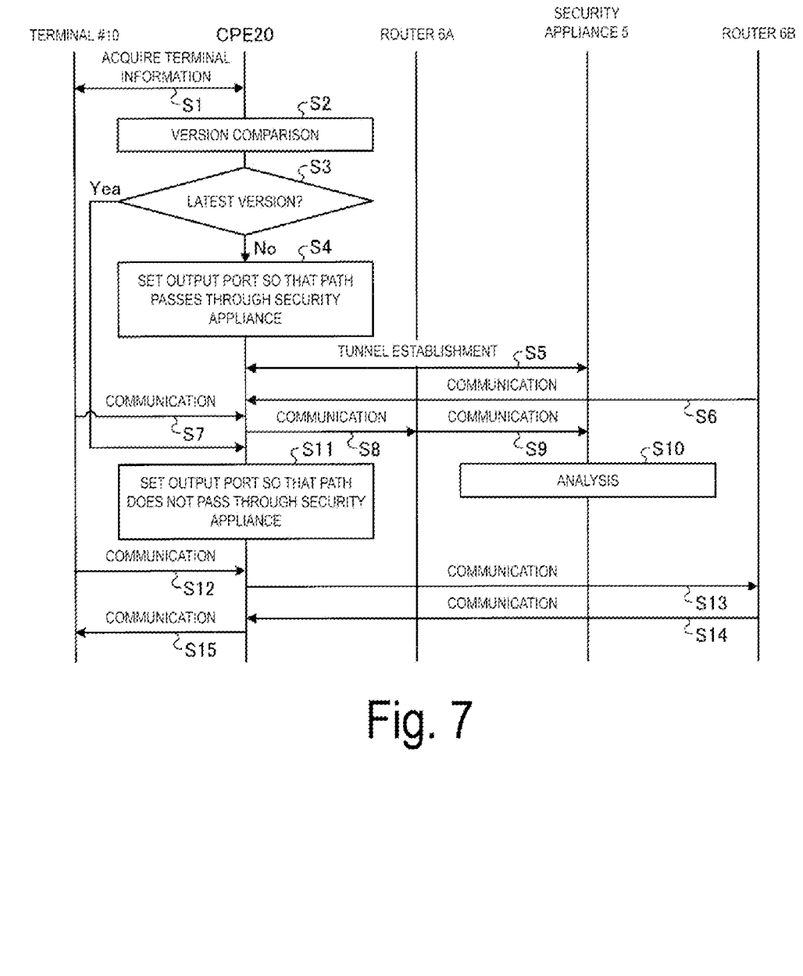
FIG. 7 is a diagram illustrating a processing procedure of the communication process according to the embodiment.

Hereinafter, a processing procedure of a communication process in the communication system 1 will be described. FIG. 7 is a diagram illustrating a processing procedure of the communication process according to the embodiment.

As illustrated in FIG. 7, the CPE 20 acquires the version information of the OS of the terminal 10 (step S1). Subsequently, the CPE 20 compares the version of the OS of the terminal 10 acquired by the terminal information acquisition unit 231 with the latest version of the corresponding OS (step S2). The CPE 20 refers to version information of the version management DB 221 to determine whether the acquired version of the OS of the terminal 10 is the latest version of the corresponding OS (step S3).

In accordance of a determination of the CPE 20 that the acquired version of the OS of the terminal 10 is not the latest version of the corresponding OS (step S3: No), the CPE 20 sets a path along which traffic of the terminal 10 passes through the security appliance 5 (step S4).

In response thereto, a connection is established by an L2 tunnel between the CPE 20 and the security appliance 5 (step S5). As a result, communication directed to the terminal 10 (step S6) is transmitted to the security appliance 5 via the CPE 20 (steps S8 and S9). The communication transmitted by the terminal 10 (step S7) is transmitted to the security appliance 5 via the CPE 20 (steps S8 and S9). In the security appliance 5, the communication that arrives is analyzed (step S10).

On the other hand, in accordance of a determination of the CPE 20 that the acquired version of the OS of the terminal 10 is the latest version of the corresponding OS (step S3: Yes), the CPE 20 sets a path along which traffic of the terminal 10 does not pass through the security appliance 5 (step S11). Thus, the communication transmitted by the terminal 10 (step S12) is transferred to a transfer destination via the CPE 20 (step S13), and the communication directed to the terminal 10 (step S14) is transferred to the terminal 10 via the CPE 20 (step S15).

Effects of Embodiment

Figure 8:
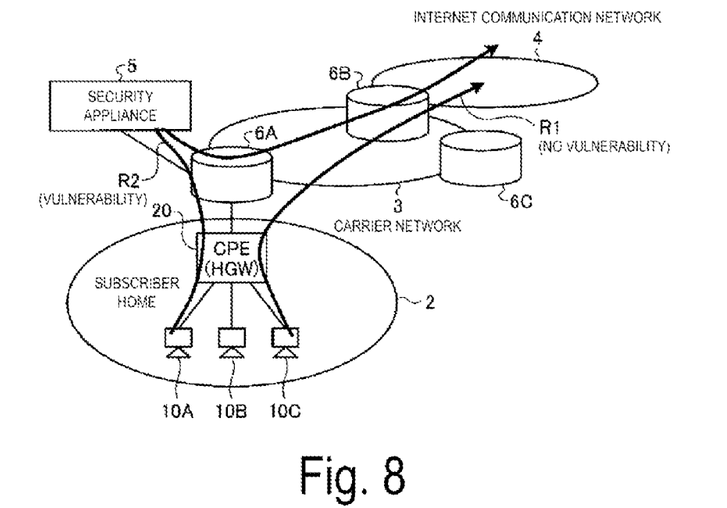
FIG. 8 is a diagram illustrating a flow of a communication system according to an embodiment.

FIG. 8 is a diagram illustrating a flow of the communication system according to the embodiment. As illustrated in FIG. 8, in the embodiment, when a version of an OS of a terminal 10A is not the latest version, the terminal 10A is considered to include vulnerability, and a path R2 along which traffic of the terminal 10A passes through the security appliance 5 is set. Further, in the embodiment, when a version of an OS of a terminal 10C is the latest version, the terminal 10C is considered to have no vulnerability, and the path R1 along which the traffic of the terminal 10C does not pass through the security appliance 5 is set.

Thus, in the embodiment, the application of the security appliance 5 to only the terminal 10 including the vulnerability allows the use of the expensive security appliance 5 to be minimized and a security service to be provided at a low cost. Thus, in the embodiment, it is possible to ensure security while reducing a load of the security appliance.

Further, in the embodiment, bandwidth control may be performed in a flow of the terminal 10 using the security appliance 5 to limit a transfer band. In this case, a load reduction effect of the security appliance 5 and an update induction effect for a user of the terminal 10 can be expected.

Further, in the embodiment, when band limitation is performed, a setting in which only update traffic is excluded from the band limitation may be performed and the user of the terminal 10 may be prompted to update.

Thus, in the embodiment, it is possible to defend only the terminal 10 with vulnerability from threats by confirming information on the vulnerability (an updated state) of the terminal 10 when the terminal 10 is connected or at a periodic timing and determining whether or not application of security is required. Further, it is possible to reduce an amount of traffic using the security appliance 5 for low costs and prompt software update by performing the band limitation on the terminal 10 with vulnerability.

In the embodiment, the version management DB 221 may be a separate apparatus from the CPE 20 and the CPE 20 may acquire the version information from the version management DB 221 as necessary.

MODIFICATION EXAMPLE

In the embodiment, a network connection method capable of applying an optimal security policy according to a type of terminal 10 or each terminal 10, as well as according to the state of the terminal 10 in a network connection service for connection to the Internet or various networks via a carrier network 3, and a CPE 20 of a subscriber home network 2 that sets the connection method are proposed.

Here, the CPE 20 that sets the connection method need not necessarily be disposed in the subscriber home network 2. For example, the CPE may be disposed as a virtual machine in a network of the carrier network 3. Hereinafter, a configuration in which the CPE is disposed as a virtual machine in the network of the carrier network 3 will be described as a modification example.

Figure 9:
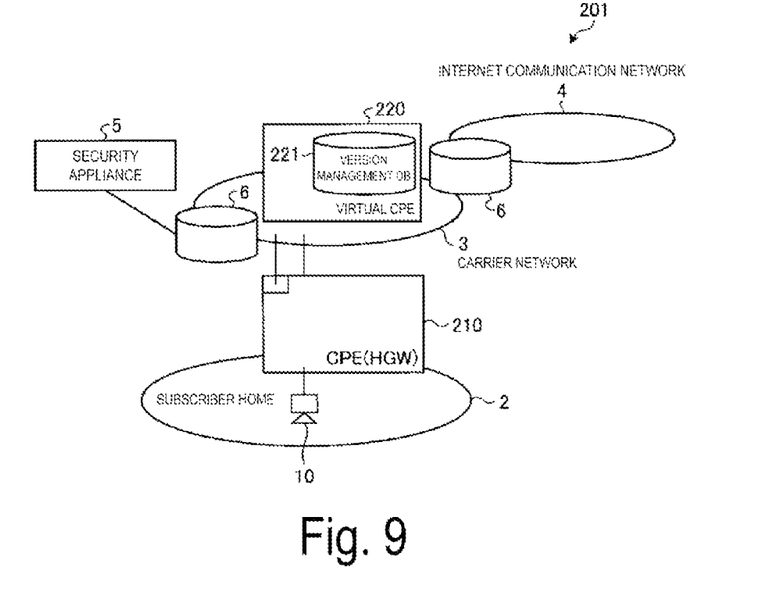
FIG. 9 is a diagram illustrating an example of a configuration of the communication system according to a modification example of the embodiment.

FIG. 9 is a diagram illustrating a configuration of a communication system according to a modification example of the embodiment. As illustrated in FIG. 9, a communication system 201 according to the modification example of the embodiment has a configuration in which a virtual CPE 220 that performs a connection setting according to a state of the terminal 10 is disposed on a network of the carrier network 3 rather than on a CPE 210 of a subscriber home network 2. This virtual CPE 220 is provided in an actual server apparatus and has the same functional configuration as that of the CPE 20 illustrated in FIG. 2.

Flow of Communication Process

Figure 10:
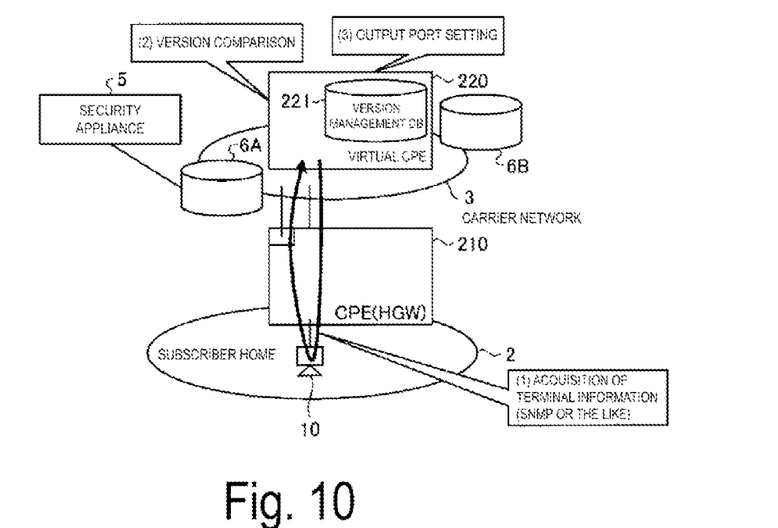
FIG. 10 is a diagram illustrating a flow of a communication process in the communication system illustrated in FIG. 9.
Figure 11:
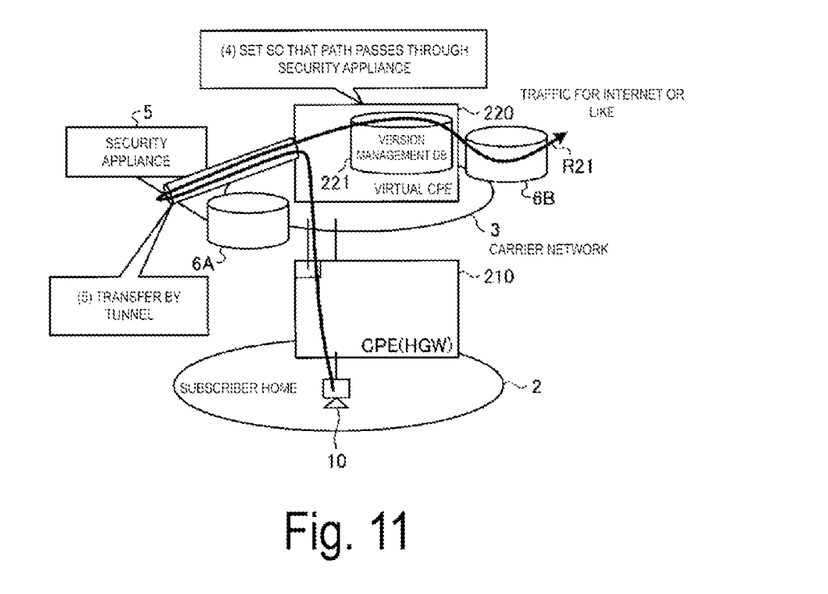
FIG. 11 is a diagram illustrating a flow of a communication process in the communication system illustrated in FIG. 9.
Figure 12:
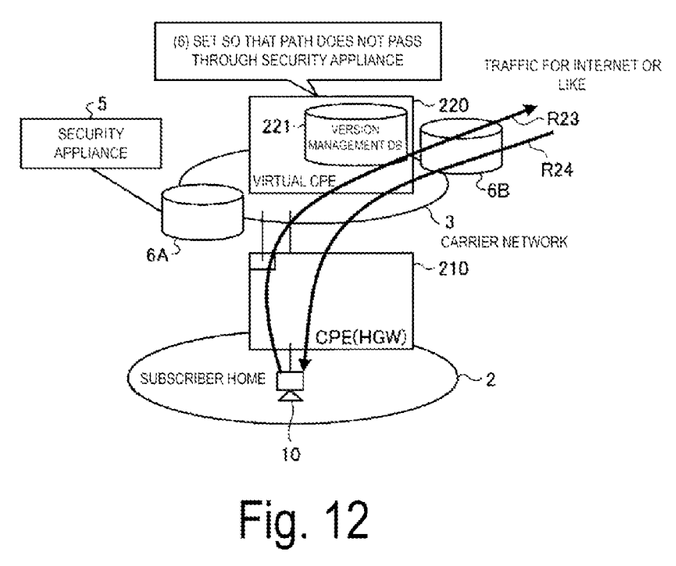
FIG. 12 is a diagram illustrating a flow of a communication process in the communication system illustrated in FIG. 9.

Next, a flow of a communication process in the communication system 201 will be described. FIGS. 10 to 12 are diagrams illustrating the flow of the communication process in the communication system 201 illustrated in FIG. 9.

As illustrated in FIG. 10, first, the virtual CPE 220 acquires the version information of the OS of the terminal 10 using an SNMP or the like (see FIG. 10(1)) and confirms the OS state of the terminal 10 when the terminal 10 is connected via the CPE 210. Subsequently, the virtual CPE 220 refers to the version information of the version management DB 221 to compare the acquired version of the OS of the terminal 10 with the latest version of the corresponding OS (see FIG. 10(2)). Then, the virtual CPE 220 sets the output port of the terminal 10 according to a result of the comparison (see FIG. 10(3)).

For example, when the version of the OS of the terminal 10 is not the latest version, the virtual CPE 220 sets a path along which traffic of the terminal 10 passes through the security appliance 5 (see FIG. 11(4)). That is, the virtual CPE 220 sets an association between an output port of the virtual CPE 220 and an IP address of the terminal 10 so that the path passes through the security appliance 5. Port settings can be realized by configuring the virtual CPE 220 using OVS and utilizing an Openflow technology. Traffic directed to the security appliance 5 is transferred by a connection being established by a L2 tunnel using a technique such as a VxLAN between the virtual CPE 220 and the security appliance 5, and a port connected to the L2 tunnel being set as the output port of the terminal 10 (see FIG. 11(5)).

As a result, communication that is the traffic for the Internet or the like transmitted by the terminal 10 is transmitted to an Internet network along a path R21 that passes through the security appliance 5. Further, communication directed to the terminal 10 is transmitted to the terminal 10 along a path that passes through the security appliance 5.

On the other hand, when the version of the OS of the terminal 10 is the latest version, the virtual CPE 220 sets a path along which traffic of the terminal 10 does not pass through the security appliance 5 (see FIG. 12(6)). That is, the virtual CPE 220 sets an association between the output port of the virtual CPE 220 and the IP address of the terminal 10 so that the path does not pass through the security appliance 5.

As a result, packets that are the traffic for the Internet or the like transmitted by the terminal 10 are transmitted to the Internet network along a path R23 that does not pass through the security appliance 5. Further, the packets directed to the terminal 10 are transmitted to the terminal 10 along a path R24 that does not pass through the security appliance 5.

The virtual CPE 220, for example, periodically confirms the state of the terminal 10 to change an appliance passing setting as follows. The virtual CPE 220 performs, when the version of the OS of the terminal 10 is updated, a setting so that the path does not pass through the security appliance 5, and performs, when the version of the OS of the terminal 10 is an older version, a setting so that the path passes through the security appliance 5.

Processing Procedure for Communication Process

Figure 13:
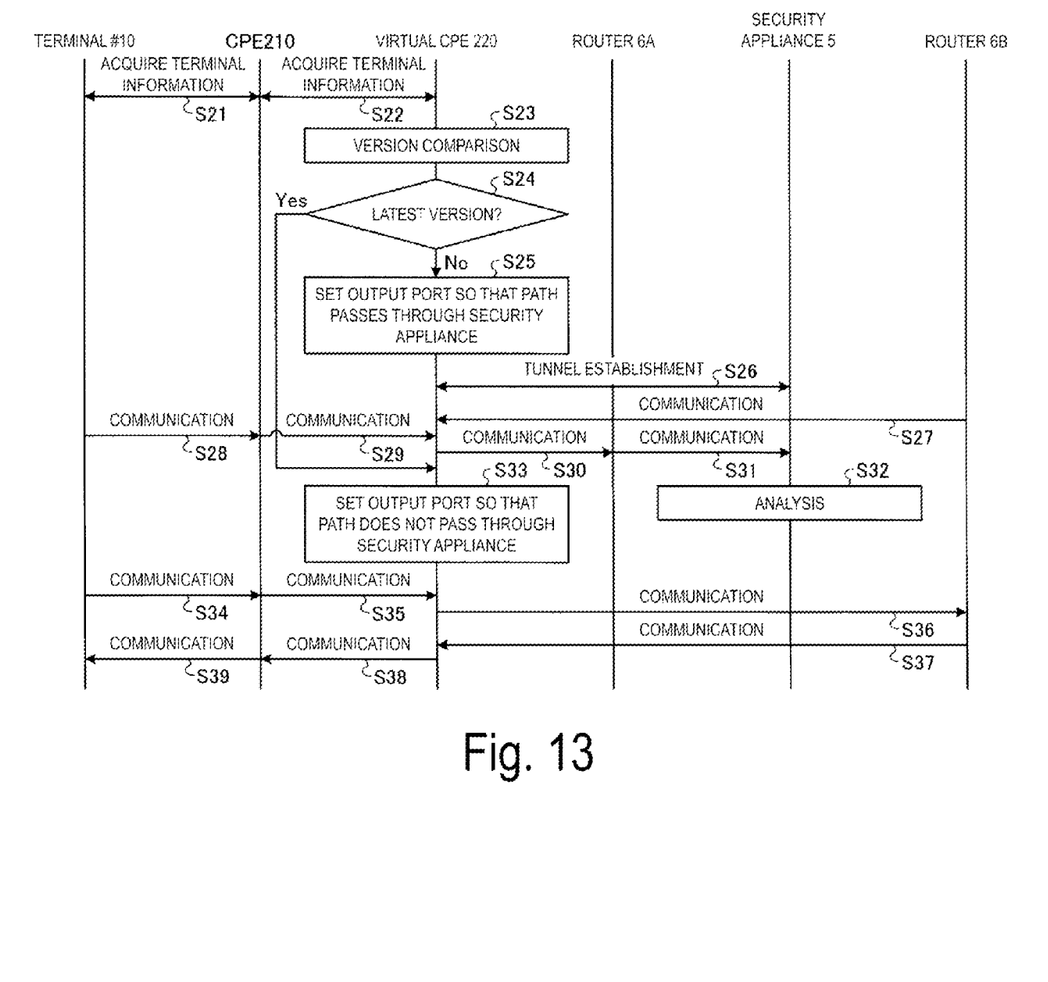
FIG. 13 is a diagram illustrating a processing procedure of the communication process according to the embodiment.

Next, a processing procedure of a communication process in the communication system 201 will be described. FIG. 13 is a diagram illustrating a processing procedure of the communication process according to the embodiment.

As illustrated in FIG. 12, the virtual CPE 220 acquires the version information of the OS of the terminal 10 via the CPE 210 (steps S21 and S22). Subsequently, the virtual CPE 220 compares the version of the OS of the terminal 10 acquired by the terminal information acquisition unit 231 with the latest version of the corresponding OS (step S23). The virtual CPE 220 refers to the version information of the version management DB 221 to determine whether the acquired version of the OS of the terminal 10 is the latest version of the corresponding OS (step S24).

In accordance of a determination of that the acquired version of the OS of the terminal 10 is not the latest version of the corresponding OS (step S24: No), the virtual CPE 220 sets a path along which traffic of the terminal 10 passes through the security appliance 5 (step S25).

Thus, a connection based on the L2 tunnel is established between the virtual CPE 220 and the security appliance 5 (step S26). As a result, communication directed to the terminal 10 (step S27) is transmitted to the security appliance 5 via the virtual CPE 220 (steps S30 and S31). Further, the communication that the terminal 10 has transmitted via the CPE 210 (steps S28 and S29) is transmitted to the security appliance 5 via the virtual CPE 220 (steps S30 and S31). The security appliance 5 analyzes the reached communication (step S32).

On the other hand, in accordance of a determination of the virtual CPE 220 that the acquired version of the OS of the terminal 10 is the latest version of the corresponding OS (step S24: Yes), the virtual CPE 220 sets a path along which traffic of the terminal 10 does not pass through the security appliance 5 (step S33). Thus, the communication that the terminal 10 has transmitted via the CPE 210 (steps S34 and S35) is transferred to the transfer destination via the virtual CPE 220 (step S36). Communication directed to the terminal 10 (step S37) is transferred to the terminal 10 via the virtual CPE 220 and the CPE 210 (steps S38 and S39).

Thus, in the modification example of the embodiment, the same effects as those of the embodiment are achieved. Further, in the modification example of the embodiment, bandwidth control may be performed in a flow of the terminal 10 using the security appliance 5 to limit a transfer band, as in the embodiment.

Further, in the modification example, a path along which transfer to the virtual CPE 220 is not performed may be set in a flow of the terminal 10 that is not vulnerable, that is, of which the OS has a latest version. In this case, because an amount of processing traffic of the virtual CPE 220 can be reduced and a load of the virtual CPE 220 can be reduced, a low cost of the entire system can be expected.

System Configuration and the Like

Components of each apparatus illustrated in the drawings are functional and conceptual components and are not necessarily physically configured as illustrated in the drawing. That is, a specific form of distribution and integration of the respective apparatuses is not limited to a form illustrated in the drawings, and all or some of the apparatuses can be distributed or integrated functionally or physically in any units according to various loads, and use situations. Further, all or some of processing functions performed by the apparatuses may be realized by a CPU and a program analyzed and executed by the CPU, or may be realized as hardware based on wired logic.

Further, all or some of the processes described as being performed automatically among the processes described in the embodiment can be performed manually, or all or some of the processes described as being performed manually can be performed automatically using a known method. In addition, information including the processing procedures, control procedures, specific names, and various types of data or parameters illustrated in the above document or drawings can be arbitrarily changed except for a case in which the information is otherwise described.

Program

Figure 14:
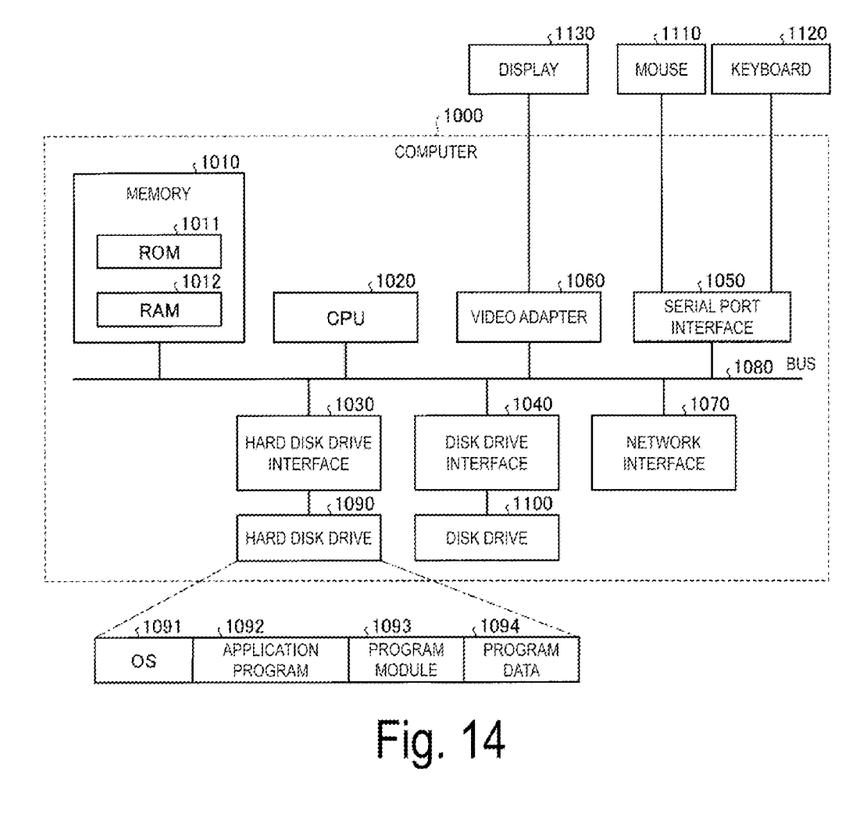
FIG. 14 is a diagram illustrating an example of a computer in which CPE and virtual CPE are realized by a program being executed.

FIG. 14 is a diagram illustrating an example of a computer in which the CPE 20 and the virtual CPE 220 are realized by a program being executed. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores a boot program, such as a basic input output system (BIOS), for example. The hard disk drive interface 1030 is connected to a hard disk drive 1090. The disk drive interface 1040 is connected to a disk drive 1100. For example, a detachable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each of processes of the CPE 20 and the virtual CPE 220 is implemented as the program module 1093 in which computer-executable code is described. The program module 1093 is stored in, for example, the hard disk drive 1090. For example, the program module 1093 for executing a process the same as that of a functional configuration in the CPE 20 and the virtual CPE 220 is stored in the hard disk drive 1090. The hard disk drive 1090 may be replaced with a solid state drive (SSD).

Further, setting data to be used in the process of the above-described embodiment is stored in, for example, the memory 1010 or the hard disk drive 1090 as the program data 1094. The CPU 1020 reads the program module 1093 or the program data 1094 stored in the memory 1010 or the hard disk drive 1090 to the RAM 1012 and executes the program module 1093 or the program data 1094, as necessary.

The program module 1093 or the program data 1094 is not limited to being stored in the hard disk drive 1090, and may be stored, for example, in a detachable storage medium and read by the CPU 1020 via the disk drive 1100 or the like. Alternatively, the program module 1093 and the program data 1094 may be stored in another computer connected via a network (a LAN, a wide area network (WAN), or the like). The program module 1093 and the program data 1094 may be read by the CPU 1020 from the other computer via the network interface 1070.

Although the embodiment to which the invention made by the present inventors is applied is described above, the invention is not limited by the description and the drawings as parts of the disclosure of the present invention according to the embodiment. That is, all of other embodiments, examples, operation technologies, and the like made by those skilled in the art on the basis of the present embodiment are within the scope of the invention.

REFERENCE SIGNS LIST 1, 201 Communication system
2 Subscriber home network
3 Carrier network
4 Internet communication network
5 Security appliance
20, 210 CPE (HGW)
21 Communication unit
22 Storage unit
23 Control unit
220 Virtual CPE
221 Version management dB
231 Terminal information acquisition unit
232 Comparison unit
233 Setting unit
234 Transfer unit

The invention claimed is:

1. A communication system in which a terminal resides in a first network and is connectable to a security apparatus residing outside of the first network, the security apparatus being configured to analyze network traffic of the terminal and determine whether to block communication of the terminal according to a result of the analysis, wherein the communication system comprises a network device residing in a second network, the network device comprising:
  a processing unit implemented by an electronic circuit; and
  a storage unit storing a program defining processing procedures that when executed by the processing unit, cause the processing unit to perform operations comprising:
    acquiring a version number of an operating system (OS) of the terminal;
    determining whether the terminal is installed with a latest version of a corresponding OS of the terminal by comparing the version number of the OS of the terminal with the latest version number of the corresponding OS, wherein the network device stores version information of a list of different OSs, the list of different OSs including the corresponding OS of the terminal, and the version information specifying the latest version number of each of the list of different OSs;

in response to determining that the terminal is not installed with the latest version of the corresponding OS, setting a path along which traffic of the terminal passes through the security apparatus that is configured to analyze the network traffic of the terminal and determine whether to block the communication of the terminal according to the result of the analysis; and in response to determining that the terminal is installed with the latest version of the corresponding OS, setting a path along which the traffic of the terminal does not pass through the security apparatus.

2. The communication system according to claim 1, wherein the network device is configured to establish, when the version of the OS of the terminal is not the latest version, a connection using an L2 tunnel between the network device and the security apparatus.

3. The communication system according to claim 1, wherein the network device is configured to:

in response to the version of the OS of the terminal not being the latest version, setting an association between an output port of the network device and an IP address of the terminal so that the path passes through the security appliance; and in response to the version of the OS of the terminal being the latest version, setting an association between the output port of the network device and the IP address of the terminal so that the path does not pass through the security apparatus.

4. A communication method executed by a network device of a communication system in which a terminal resides in a first network and is connectable to a security apparatus residing outside of the first network, the security apparatus being configured to analyze network traffic of the terminal and determine whether to block communication of the terminal according to a result of the analysis, the network device residing in a second network, the communication method comprising:

acquiring version number of an operating system (OS) of the terminal;

determining whether the terminal is installed with a latest version of a corresponding OS of the terminal by comparing the version number of the OS of the terminal with the latest version number of the corresponding OS, wherein the network device stores version information of a list of different OSs, the list of different OSs including the corresponding OS of the terminal, and the version information specifying the latest version number of each of the list of different OSs;

setting, in response to determining that the terminal is not installed with the latest version of the corresponding OS, a path along which traffic of the terminal passes through the security apparatus that is configured to analyze the network traffic of the terminal and determine whether to block the communication of the terminal according to the result of the analysis; and setting, in response to determining that the terminal is installed with the latest version of the corresponding OS, a path along which the traffic of the terminal does not pass through the security apparatus.

5. The communication method according to claim 4, further comprising:

establishing, when the version of the OS of the terminal is not the latest version, a connection using an L2 tunnel between the network device and the security apparatus.

* * * * *